Jan. 7, 1969  H. S. BELSON  3,421,075
THIN FILM MAGNETOMETER USING THIN FILM COATED CONDUCTORS
Filed May 27, 1966

"HARD" AXIS 19
"EASY" AXIS 16

MAGNETIC FIELD APPLIED DURING PLATING

INVENTOR
Henry S. Belson

BY J.O. Tresansky
ATTORNEY

United States Patent Office 3,421,075
Patented Jan. 7, 1969

3,421,075
THIN FILM MAGNETOMETER USING THIN
FILM COATED CONDUCTORS
Henry S. Belson, Adelphi, Md., assignor to the United
States of America as represented by the Secretary of
the Navy
Filed May 27, 1966, Ser. No. 554,293
U.S. Cl. 324—43
Int. Cl. G01r 33/02; G11b 5/00; G03g 1/08
6 Claims

ABSTRACT OF THE DISCLOSURE

A thin film magnetometer which employs the use of a conductor(s) coated with thin films of ferromagnetic material. When placed in an external magnetic field the inductance of the thin film coated conductor(s) will vary in accordance with the magnitude of the external magnetic field and thus give an indication thereof.

---

The invention described herein may be manufactured and used by or for the Government of the United States of America for governmental purposes without the payment of any royalties thereon or therefor.

This invention relates to magnetometers and more particularly to magnetometers having thin film sensing elements.

Thin films, which are usually evaporated onto a glass substrate or electroplated onto metallic conductors by methods which are well known in the art, have distinct advantages over conventional magnetic elements. One of these advantages is that thin films can have single magnetic domains. Another desirable feature is that these films have a uniaxial anisotropy direction along the so called "easy" axis. If a magnetic field is applied in the plane of the film normal to the "easy" axis and the component of the magnetic moment in this same normal direction is measured the result will be a hysterisis loop which is a single line. In other words, for small alternating fields, a linear, essentially lossless initial permeability is obtained. The magnetic moment of the film rotates in a single domain, therefore, Barkhousen noises, which are normally present in magnetic cores, are eliminated. It has also been demonstrated in thin films that the time necessary for change in direction of the magnetic moment is in the order of nanoseconds as contrasted with the order of microseconds necessary for change in magnetic moments in ferrites, for example. Thus thin film sensing elements are suitable for high frequency low-noise use.

It is an object of this invention to provide a magnetometer capable of operating at very high frequencies.

It is another object of this invention to provide a magnetometer having very low power requirements.

It is yet another object of this invention to provide a magnetometer in which the sensing elements have a uniaxial anisotropy.

It is another object of this invention to utilize the advantageous benefits of thin magnetic wire films in a magnetometer.

It is yet another object of this invention to provide a sensing element for a magnetometer which has a single domain whereby Barkhausen noises are eliminated.

It is a further object of this invention to provide a thin film wire element in which the inductance of the wire element varies as the strength of the external magnetic field is changed.

These and other objects are attained by a magnetometer which employs wire elements coated with a thin film of ferromagnetic material. In a preferred embodiment of this invention, a magnetometer is provided in which four such thin film coated wire elements are arranged in a Wheatstone bridge type circuit.

Figure 1:
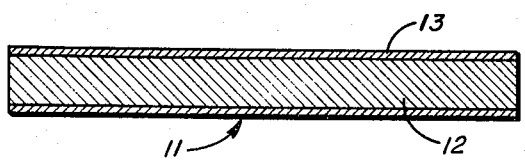
Figure 2:
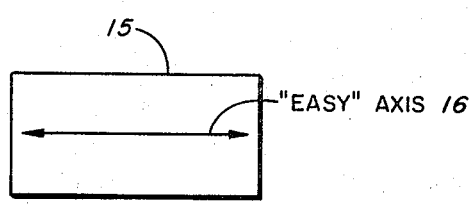
Figure 3:
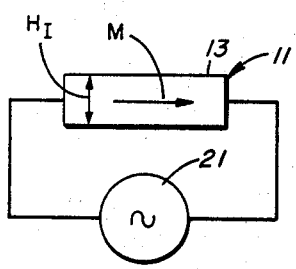
Figure 4:
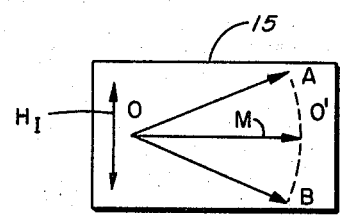
Figure 5:
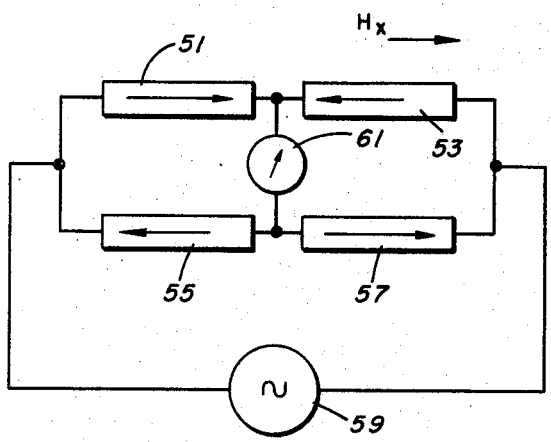

A more complete appreciation of the invention and many of the attendant advantages thereof will be readily appreciated as the same becomes better understood by reference to the following detailed description when considered in connection with the accompanying drawings wherein:

FIG. 1 of the drawing illustrates in cross section the structure of the magnetic sensing element of the magnetometer of the instant invention;

FIG. 2 of the drawing illustrates the anisotropic properties of the thin magnetic film used in the instant invention;

FIG. 3 of the drawing illustrates a thin film wire portion connected to a source of A-C voltage;

FIG. 4 of the drawing shows the magnetic moment rotation of a thin film segment under D-C stimulation; and FIG. 5 of the drawing shows a Wheatstone bridge arrangement of the magnetometer of the instant invention.

Referring now to FIG. 1 of the drawing a cylindrical conductor 11 is shown which, for example, may have a copper beryllium wire center portion 12 coated preferably by an electroplating process with a thin film of a ferromagnetic alloy 13. The alloy containing for example, approximately 20% iron and 80% nickel. The wire may be 0.5 mil in diameter.

In FIG. 2 of the drawing a small segment 15 or area of a thin film surface is illustrated, with its single or uniaxial anisotropy representing the "easy" axis direction identified by a double-ended arrow 16. During the electroplating operation, a magnetic field is applied in the direction shown by arrow 17. The double-ended arrow 19 is perpendicular to the anisotropic axis and represents the hard directions of magnetization.

In FIG. 3, the wire conductor 11 is shown having an applied moment indicated by arrowhead M which is parallel to the easy anisotropic axis. When an alternating current is applied from an A-C source 21 to the conductor 11, a magnetic field $H_I$ is produced in the directions shown by the arrow $H_I$ which is perpendicular to the direction of M and also perpendicular to the "easy" axis of the film. One form of magnetomer may be a circuit such as that of FIG. 3 with a meter added to indicate changes in induction.

Referring now to FIG. 4 of the drawing, the effect of an alternating magnetic field $H_I$ upon the moment M in segment 15 is shown. The moment M will vary from a neutral or axially aligned axis OO' to an upper position OA and a lower position OB. The amount that the magnetic moment will swing angularly from the "easy" axis will depend upon the anisotropy of the magnetic materials, the strength of the magnetic moment M and the strength of the perpendicular magnetic field $H_I$ which is due to current flow in the wire. This characteristic can be used to detect a magnetic field in a magnetometer.

Referring now to FIG. 5 of the drawing magnetic sensing elements 51, 53, 55 and 57, are connected in a Wheatstone bridge arrangement to an A-C supply voltage 59 and to a volt meter 61. The direction of the magnetic moment M in each of the sensing elements is shown by the arrow within each of the elements. Assuming now that the magnetometer circuit of FIG. 5 is placed in a field $H_x$ having a direction and a magnitude, $H_x$ representing a field to be measured, such as for example, the earth's magnetic field. With the magnetic field $H_x$ in the direction as shown, the oscillating angular displacement of the magnetic moment of elements 51 and 57 will be decreased and the oscillating angular displacement of the magnetic moments of the elements 53 and 55 will be increased. As a result, the inductive impedance of elements 51 and 57 will be decreased and the inductive impedance of elements 53 and 55 will be increased. In the absence of a magnetic field with the moment of each of the elements 51, 53, 55 and 57 of equal magnitude the current flow through each of the elements will be equal with no current flowing through meter 61. With the unbalance of impedances created by the presence of the field $H_x$ the A-C current flow through elements 53 and 55 will be decreased thus causing an unbalance in the bridge circuit and the current will flow through meter 61. With proper calibration the magnitude of the current flow through 61 will indicate the magnitude of the magnetic field $H_x$ to be measured.

Another embodiment for measuring the strength of a magnetic field may be an LC tank circuit in which the inductance element is the thin film element of this invention. The resonant frequency of such an LC circuit will vary with the strength of the ambient magnetic field.

Obviously many modifications and variations of the present invention are possible in the light of the above teachings. It is therefore to be understood that within the scope of the appended claims, the invention may be practiced otherwise than as specifically described.

What is claimed as new and desired to be secured by Letters Patent of the United States is:

1. A magnetometer comprising:
    four linearly disposed conductors each having a thin film ferromagnetic surface formed thereon, said conductors being disposed in the same geometric direction, the first and second of said conductors being serially connected between a common first and second junctures, the third and fourth of said conductors being connected to said common first and second junctures,
    current measuring means connected to a juncture between said first and second conductors and to a juncture between said third and fourth conductors,
    said first and fourth conductors having a first magnetic moment in a first direction and said second and third conductors having a second magnetic moment in a second direction antiparallel to the direction of said first magnetic moment, and
    means for connecting said common first and second junctures to an A-C voltage source.

2. In a magnetometer, a magnetic field sensing element comprising:
    an electrical conductor, cylindrically shaped and having a ferromagnetic thin film coating on the surface thereof, said conductor having a uniaxial anisotropy axis along the axial direction of said conductor and a magnetic moment parallel to such anisotropy axis, the inductance of said conductor varying in proportion to the strength of an externally applied magnetic field to be measured.

3. A thin film magnetometer element comprising a linearly disposed conductor,
    a ferromagnetic coating on said conductor, and
    said coating having a magnetic moment in a desired direction along the easy magnetizing axis, the inductance of said conductor varying in proportion to the strength of an ambient external magnetic field.

4. A magnetometer as in claim 1 in which said first and second conductors are formed in an integral unit having first and second portions with magnetic moments in opposite directions and said third and fourth conductors are formed in an integral unit having third and fourth portions with magnetic moments in opposite directions.

5. A magnetometer as in claim 1 in which said conductors are comprised of copper beryllium wires having a diameter of 0.5 mil and being coated with a thin magnetic film comprising a ferromagnetic alloy of 80% nickel and 20% iron.

6. A magnetometer circuit comprising:
    a Wheatstone bridge circuit having ferromagnetic sensing elements in the legs thereof, each of said sensing elements comprising a conductor having a thin film of ferromagnetic material electroplated thereon, and each of said sensing elements being linearly disposed and oriented in the same direction, said elements having predisposed magnetic moments alternately, disposed in parallel and anti-parallel directions,
    current indicating means connected to said bridge circuit, and
    means for connecting said bridge circuit to an A-C voltage source.

References Cited

UNITED STATES PATENTS

| | | | |
|---|---|---|---|
| 2,632,883 | 3/1953 | Richardson | 324—43 X |
| 3,132,299 | 5/1964 | Hochschild | 324—34 |
| 3,227,944 | 1/1966 | Hasty | 324—43 X |
| 3,239,754 | 3/1966 | Odom | 324—47 |
| 3,271,665 | 9/1966 | Castro et al. | 324—43 |
| 3,083,353 | 3/1963 | Bobeck | 340—174 |
| 3,042,997 | 7/1962 | Anderson et al. | 340—174 |
| 3,031,648 | 4/1962 | Haber et al. | 340—174 |

RUDOLPH V. ROLINEC, *Primary Examiner.*

P. A. URIBE, *Assistant Examiner.*

U.S. Cl. X.R

340—174; 117—93.2